Figure 2:
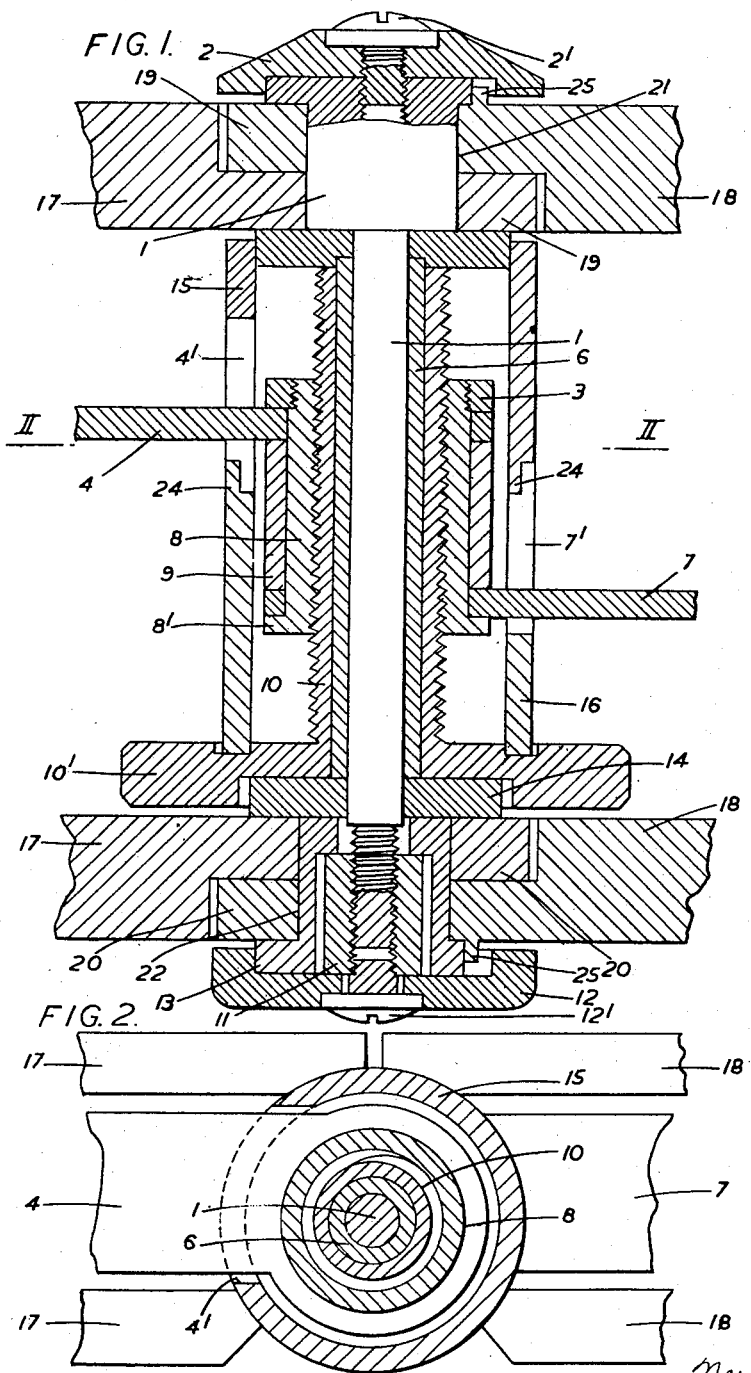

Jan. 8, 1952     N. KERSHAW ET AL     2,581,865
SECTIONAL COVER FOR PROTECTING THE
FOCUSING MECHANISM OF BINOCULARS
Filed March 26, 1947

FIG. I.

Inventors
Norman Kershaw
Harry Ryder
By
Cushman, Darby & Cushman
Attorneys

Patented Jan. 8, 1952

2,581,865

UNITED STATES PATENT OFFICE 2,581,865

SECTIONAL COVER FOR PROTECTING THE FOCUSING MECHANISM OF BINOCULARS

Norman Kershaw and Harry Ryder, Leeds, Yorkshire, England

Application March 26, 1947, Serial No. 737,224
In Great Britain July 12, 1945

Section 1, Public Law 690, August 8, 1946
Patent expires July 12, 1965

3 Claims. (Cl. 88—34)

This invention relates to binoculars having a hinged body for interocular adjustment, or to permit of the spacing of the optic axes to be adjusted and a focussing mechanism actuating a correspondingly hinged bridge carrying the focussing lenses, the hinged bridge being within the hinged body of the binoculars.

According to the present invention the focussing mechanism comprises bridge arms pivotally connected to a focussing nut mounted on the focussing screw which is encased in a divided or two part cover having slots or apertures for the bridge arms. The divided or two part cover constitutes a complete cover for the focussing mechanism when the latter is mounted in the binoculars. The binocular body is made in two parts, each part having upper and lower hinge members or arms through the aperture of which the axle of the focussing mechanism passes.

More specifically the invention relates to binoculars of the kind having a hinged body for interocular adjustment and a focussing mechanism, wherein the focussing mechanism comprises bridge arms pivotally connected to a focussing nut mounted on a focussing screw which is encased in a two part cover each part of which is free to rotate with its respective bridge arm by virtue of the arm engaging the side of a slot in the respective cover part so that the focussing mechanism not enclosed by the body of the binoculars is always protected by the two part cover.

In order that the invention may be clearly understood and readily carried into effect the same will now be more fully described with reference to the embodiment illustrated in the accompanying drawings in which:

Figure 1 is a sectional elevation of the hinged body of the binoculars having the invention applied thereto, and, Figure 2 is a sectional plan on the line II—II of Figure 1.

Referring to the drawing 1 represents the axle of the binoculars, 4 the left hand bridge arm, 7 the right hand bridge arm, 8 the focussing nut mounted on the focussing screw 10, and 15 and 16 represent upper and lower parts of an axle cover constituting a complete cover for the focussing mechanism when the latter is mounted in the binoculars.

It will be seen that the cover is divided into two parts that is the upper part 15 and the lower part 16. The binocular body (not shown) comprises two hollow parts each part having a pair of arms 17 and 18 the ends of said arms constituting upper and lower co-operating spaced hinge members or arms 19 and 20 respectively through the upper aperture 21 and lower aperture 22 of which the axle 1 of the focussing mechanism passes.

Each part 15, 16 of the two part cover of the focussing mechanism is free to rotate, the one on the other, at the half-lap or like joint 24, together with its respective bridge arm 4 or 7 so that the focussing mechanism, which need not necessarily be enclosed by the body of the binoculars is, however always protected by the two part cover 15, 16. It will be understood that the parts 15, 16 rotate in opposite directions, that is to say the upper part 15 rotates with the left hand bridge arm 4 and the lower part 16 with the right hand bridge arm 7.

Between the co-operating hinge members or arms 19, 20 the focussing mechanism enclosed within the parts 15 and 16 of its cover is placed. Each part of the two part casing or cover 15, 16 is capable of individual rotation and has a slot $4^1$ or $7^1$ through which respectively the bridge arm 4 or 7 passes to enter the body of the binoculars and to be attached to the respective eye pieces or focussing lenses.

The focussing mechanism comprises the focussing screw 10 which may be secured to or formed integrally with an adjusting knob or ring $10^1$, and a hollow bush or spindle 6 constituting a hinge spacing tube passes through the focussing screw 10.

As previously stated the focussing screw 10 may be formed integral with the adjusting ring or knob $10^1$ and will be hollow to receive the axle 1 of the focussing mechanism which passes there through to secure together the mechanism and upper and lower hinge members 19 and 20 of the body.

Through the hinge spacing tube 6 passes the axle 1 which has an enlarged portion at one end to afford a hinge bearing and screw $2^1$ or the like for the co-operating hinge members 17, 18, of the body. A top washer 2 is held by a screw $2^1$ and a bottom washer 12 held by screw $12^1$ is only used as a cover. A hinge bearing bush 13 is held in situ by an axle clamp nut 11. A lower hinge clamp washer 14 is arranged between the focussing screw 10 and the hinge bearing bush 13.

The bridge arms 4 and 7 suitably formed to carry the focussing lenses or eye pieces are pivotally mounted upon the focussing nut 8 by means of a spacing collar 9 and focussing nut lock ring 3. The upper bridge arm 4 is thus retained between the nut lock ring 3 and the spacing collar 9 whilst the lower bridge arm 7 is retained between the spacing collar 9 and a flange 8¹ on the focussing nut 8. By this arrangement the focussing nut 8 is free to move upwardly or downwardly as the focussing screw 10 is rotated and thus carry the bridge arms with it, said arms sliding in the respective slots 4¹ or 7¹ in the two part cover 15, 16. The pivotal mounting is so arranged that whilst the bridge arms 4, 7 will be carried by the movement of the focussing nut 8 for the purpose of focussing the lenses, they are also capable of independent rotation as regards each other for the purpose of interocular adjustment or movement of the eye pieces about the central axis 1, for adjustment of the optical axes.

It will be understood that focussing of the lenses does not interfere with interocular adjustment and vice versa. A stop 25 is to prevent rotation of the hinge bearing bush 13 and the axle 1 as the entire axle is secured to the outer body parts 18, 18, and does not rotate on this half of the binocular body. In all positions the focussing mechanism is totally enclosed except for the slots 4¹, 7¹ within which the bridge arms move, and entry of foreign matter into the cover of the focussing mechanism is prevented even though it is not enclosed by the body of the binoculars.

What we claim is:

1. Binoculars of the class described including a two part binocular body having spaced pairs of hinged members, an axle supporting said hinged members, a focussing mechanism between said pairs of hinged members and including a focussing screw rotatable on said axle, a focussing nut mounted on said screw, spaced bridge arms pivotally connected to said focussing nut and extending outwardly therefrom in opposite directions, a cover for the focussing mechanism, said cover being formed of two axially aligned independently rotatable sections, said sections having axially offset slots therein through which extend said bridge arms, said slots being of such a length to allow axial or longitudinal movement of the bridge arms along the focussing screw, the sections of the cover being independently rotatable so that the bridge arms are angularly adjustable about the focussing screw, and means for rotating the focussing screw to move the focussing nut axially thereon and carry the bridge arms along the focussing screw and for moving the bridge arms against the sides of their adjacent slots to rotate the sections of the cover, the parts being constructed and arranged so as to insure the part of the focussing mechanism which is not enclosed by the body of the binoculars being protected by the sectional cover upon rotation of one of the sections and its associated bridge arm.

2. Binoculars as called for in claim 1, in which the cover sections are rotatably connected by an overlapping joint.

3. Binoculars as called for in claim 1, in which each of the bridge arms is mounted on the focussing nut by a spacing collar, said focussing nut having a flange, a locking ring threadedly connected to the focussing nut, one of said bridge arms being confined between the locking ring and the spacing collar, and the other bridge arm being confined between said flange and the spacing collar.

NORMAN KERSHAW.
HARRY RYDER.

REFERENCES CITED

The following references are of record in the file of this patent:

UNITED STATES PATENTS

| Number | Name | Date |
|---|---|---|
| 1,479,409 | Edstrom | Jan. 1, 1924 |
| 2,047,909 | North | July 14, 1936 |
| 2,285,388 | Benard | June 9, 1942 |

FOREIGN PATENTS

| Number | Country | Date |
|---|---|---|
| 167,483 | Great Britain | Mar. 16, 1922 |
| 116,555 | Switzerland | Dec. 16, 1926 |
| 410,292 | Great Britain | May 17, 1934 |
| 584,390 | Great Britain | Jan. 14, 1947 |